P. MARTIN.
Lamp Wicks.

No. 145,667.  Patented Dec. 16, 1873.

Witnesses.
Geo Gray
F. C. Hale,

Pearl Martin.
by his attorney.

UNITED STATES PATENT OFFICE.

PEARL MARTIN, OF MEDFORD, ASSIGNOR TO HIMSELF AND EDWARD S. GILMAN, OF SOMERVILLE, MASSACHUSETTS.

IMPROVEMENT IN LAMP-WICKS.

Specification forming part of Letters Patent No. 145,667, dated December 16, 1873; application filed September 10, 1873.

*To all whom it may concern:*

Be it known that I, PEARL MARTIN, of Medford, in the county of Middlesex and State of Massachusetts, have invented a new and useful Improvement in Hydrocarbon-Vapor Lamps, of which the following is a specification—

Figure 1:
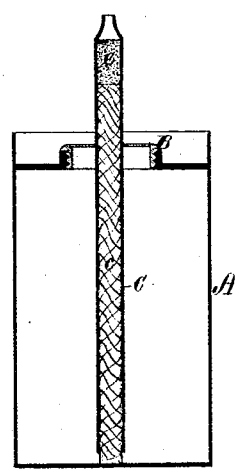
Figure 2:

Figure 1 of the accompanying drawing denoting a central and vertical section of a lamp constructed in accordance with my invention.

My invention is specially designed for small lamps for hospitals or rooms for the sick, where only a small light is required. The object of my invention is to provide a simple, cheap, non-explosive apparatus for generating and burning the vapor of kerosene or other hydrocarbon fluid.

In carrying out my invention, the lamp or fluid-reservoir A may be of any desirable external form, and provided with a screw-cap, B, of the ordinary construction. C is the wick and vapor-forming tube, which is made of glass, and extends down, through the cap B, to near the bottom of the reservoir. The lower part of the tube I fill with cotton, cotton yarn, or wicking, and extend the same up to about three-fourths of an inch from the top of the tube. Over the cotton layer I place a thin stratum of pulverized clay, or equivalent earthy material, and above the latter a layer of asbestos reduced to a fibrous or comminuted state, and extend the latter up to about one-fourth of an inch from the top of the tube, earthy material and cotton forming a continuous capillary medium, by which the hydrocarbon fluid is raised.

By the above-described arrangement of the asbestos packing or wicking over the argillaceous or earthy and the cotton stratums, the first-named, being non-destructible by heat, does not become carbonized or charred like the ordinary cotton wicking as generally employed, and can be used for weeks without being changed, while the cotton, being protected from the carbonizing influence of the heat, retains its capillary power for a much greater length of time.

By the employment of the earthy medium between the asbestos and cotton, I find that a more steady and uniform light is attained.

By the employment of a glass wick and vapor-generating tube, the glass being a poor conductor of heat, such tube will not become heated but a short distance from its outer end, so that no gas or vapor can be generated thereby within the reservoir of the lamp.

In lighting the lamp, the flame of a match, when brought in contact with the upper portion of the glass tube, will suffice to rarefy or generate sufficient vapor within the same to produce by ignition a small flame as it issues from the top of the tube. This having been effected, the heat of the flame, acting on the fluid suspended in the asbestos, will create the necessary amount of vapor to maintain the flame of the lamp.

Having described my invention, what I claim is—

In a lamp or apparatus for generating and burning the vapor of a hydrocarbon fluid, the combination of the cotton, argillaceous, and asbestos mediums, arranged within a glass tube, c, in manner and for the purpose set forth.

PEARL MARTIN.

Witnesses:
F. P. HALE,
F. C. HALE.